United States Patent
Desmicht et al.

(10) Patent No.: US 9,288,046 B2
(45) Date of Patent: Mar. 15, 2016

(54) DEVICE FOR GENERATING AN ENCRYPTED KEY AND METHOD FOR PROVIDING AN ENCRYPTED KEY TO A RECEIVER

(71) Applicant: THOMSON LICENSING, Issy de Moulineaux (FR)

(72) Inventors: Eric Desmicht, Thorigne-Fouillard (FR); Olivier Courtay, Rennes (FR); Renaud Rigal, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/191,435

(22) Filed: Feb. 27, 2014

(65) Prior Publication Data

US 2014/0247938 A1 Sep. 4, 2014

(30) Foreign Application Priority Data

Mar. 4, 2013 (EP) ..................................... 13305245

(51) Int. Cl.
*H04L 9/00* (2006.01)
*H04L 9/08* (2006.01)

(52) U.S. Cl.
CPC ............ *H04L 9/0861* (2013.01); *H04L 9/0822* (2013.01); *H04L 9/0866* (2013.01); *H04L 2209/603* (2013.01)

(58) Field of Classification Search
None
See application file for complete search history.

(56) References Cited

U.S. PATENT DOCUMENTS

| | | | |
|---|---|---|---|
| 6,735,313 B1 | 5/2004 | Bleichenbacher et al. | |
| 7,724,907 B2 * | 5/2010 | Candelore | 380/281 |
| 2003/0061477 A1 * | 3/2003 | Kahn et al. | 713/150 |
| 2003/0061607 A1 * | 3/2003 | Hunter et al. | 725/32 |
| 2007/0095927 A1 | 5/2007 | Pesonen | |
| 2008/0089516 A1 * | 4/2008 | Cocchi et al. | 380/200 |
| 2009/0063859 A1 | 3/2009 | Maeda | |
| 2009/0323962 A1 | 12/2009 | Aciicmez et al. | |
| 2010/0296655 A1 | 11/2010 | Solow et al. | |
| 2011/0004758 A1 | 1/2011 | Walker et al. | |
| 2011/0013773 A1 | 1/2011 | Pinder | |
| 2015/0003614 A1 * | 1/2015 | Cocchi et al. | 380/281 |

OTHER PUBLICATIONS

Search Rept:July 2, 2013.

* cited by examiner

*Primary Examiner* — Kaveh Abrishamkar
(74) *Attorney, Agent, or Firm* — Myers Wolin LLC

(57) ABSTRACT

A device for generating an encrypted master key. The device comprises at least one input interface configured to receive a receiver identifier, a service provider identifier and a master key for the service provider; a memory configured to store a secret of the device; a processor configured to: process the receiver identifier using the secret to obtain a root key, process the service provider identifier using the root key to obtain a top key and process the master key using the top key to obtain an encrypted master key; and an output interface configured to output the encrypted master key. Also provided is a method for providing an encrypted master key to a receiver. An advantage is that the device can enable a new service provider to provide services to a receiver using an already deployed smartcard.

18 Claims, 3 Drawing Sheets

DEVICE FOR GENERATING AN ENCRYPTED KEY AND METHOD FOR PROVIDING AN ENCRYPTED KEY TO A RECEIVER

This application claims the benefit, under 35 U.S.C. §119 of European Patent Application 13305245.6, filed Mar. 4, 2013.

TECHNICAL FIELD

The present invention relates generally to cryptographic systems and in particular to enabling a deployment of services needing cryptographic keys provided by new service providers in a secure manner.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conditional access systems (which will be used as a non-limitative example) for television (and other media) have been around for a long time to protect different kinds of content. Briefly speaking, in such a system, a service provider obtains content from a content provider and uses the conditional access system (CAS) to protect the content, notably using encryption, before delivery to a customer. The customer generally has some kind of decoder that implements part of the conditional access system and thereby verifies if the user has the rights to access the content and, if so, decrypts and renders the content.

As is well known, at the user end, the part of the CAS is often implemented in a smartcard (which will be used herein as a non-limitative example of a security module) that is removably inserted into the decoder. The smartcard is provided, at least indirectly, by the CAS provider that guarantees the security of the system: neither the decoder master key $Km_i$ nor the keys that are obtain through its use should not be possible to extract from the smartcard.

FIG. 1 illustrates a first prior art scheme for accessing to a service. To allow a decoder equipped with a smartcard with identifier STBi access to a service j, encrypted using a service key $K_j$ (advantageously common to all decoders in the system), the service provider encrypts service j using a symmetric encryption algorithm (such as for example Advanced Encryption Standard, AES) and the service key $K_j$ before transmission. The service provider also encrypts the service key $K_j$, which can be common for all decoders, using a key that corresponds to the master key $Km_i$ and, preferably, the symmetric encryption algorithm and transmits the encrypted service $E\{K_j\}(j)$ and a message M(i,j) with the encrypted service key to the decoder.

The decoder first decrypts the message M(i,j) using the symmetric encryption algorithm and its master key $Km_i$ to obtain the service key $K_j$ that is the used with the symmetric encryption algorithm for decryption of the encrypted service $E\{K_j\}(j)$ to obtain the service j. Since the master key $Km_i$ is specific to the decoder, it is the only one that can decrypt the service using the message M(i,j).

FIG. 2 illustrates a second prior art scheme for accessing to a service. In order to enable more flexibility and more security in the system, it is often preferable to use a session key $Ks_{j,t}$ for the service j and, typically, a time period t. In this case the service provider encrypts the service j using the session key $Ks_{j,t}$ to obtain an encrypted service $E\{Ks_{j,t}\}(j)$, encrypts the session key Ks(j,t) using the service key $K_j$ to obtain a first message T(j,t), and encrypts the service key $K_j$ using the decoder master key $Km_i$ to obtain a second message M(i,j). The encrypted service $E\{K_{j,t}\}(j)$, the first message T(j,t) and the second message M(i,j) are sent, not necessarily at the same time to the decoder.

As in FIG. 1, the decoder reverses the operations. It decrypts the second message M(i,j) using the decoder master key $Km_i$ to obtain the service key $K_j$, decrypts the first message T(j,t) using the service key $K_j$ to obtain the session key that is used to decrypt the encrypted service $E\{Ks_{j,t}\}(j)$ to obtain the service j.

The schemes illustrated in FIGS. 1 and 2 work well in systems with a single service provider. However, recently the decoders have begun to evolve from 'merely' providing decryption of content to include new applications. Examples of such new applications comprise:

Transmission of value-added services, in a compressed format, destined for other devices in the user's home network, e.g. a second decoder, a smartphone or a tablet computer.

Download and execution of applications such as games from an application store (e.g. Apple Store, Freebox Revolution).

The content provider can provide value-added services via the decoder to the user, wherein the value-added services are not under the control of the service provider or the CAS provider.

This means that the CAS's responsibilities are evolving. Previously guarantors for the security of the entire system, they become responsible for the security of the value-added services of the service provider while they at the same time 'share' the decoder with other, 'secondary,' service providers.

It is likely that the secondary service providers demand their own security functionality for protecting their services in the decoder and that this functionality provides a security level at least equal to that of the CAS.

It is possible to add further service providers by, for example, adding a story on top of the ones illustrated in FIGS. 1 and 2. Such a scheme is illustrated in FIG. 3 that extends the scheme illustrated in FIG. 1.

The further service providers have their master keys $Km_{i,k}$, encrypted using a root key for STBi $Kr_i$ to obtain an encrypted master key W(i,k), where i is the index of STBi and k is the index of the service provider. This encrypted master key W(i,k) may be obtained using the smartcard by providing the master key $Km_{i,k}$ to the smartcard that, as long as a specific fuse has not been blown, encrypts the master key $Km_{i,k}$ using the root key $Kr_i$ and outputs the encrypted master key W(i,k). The encrypted master key W(i,k) may then be stored outside the smartcard, for example in a flash memory. However, once the fuse is blown, the smartcard does not encrypt keys, it only decrypts encrypted keys.

It is to be noted that it is not necessary to know the root key, but it is impossible to add service providers during the lifetime of the smartcard, since the fuse for security reasons is blown before delivery to the end user. Even though encryption is the same as decryption in symmetric encryption, it is not possible to provide a key for 'decryption' and hope to obtain the 'decrypted'—being the same as encrypted—key, since only the decrypted service is output from the smartcard; the intermediate keys are kept inside.

The decoder i receives the encrypted master key W(i,k) and decrypts it using the root key $Kr_i$ and outputs the master key $Km_{i,k}$, which is used to decrypt a second message (M,i,j,k) to obtain a service key $K_{j,k}$ for the service provider k. The service key $K_{j,k}$ is then used to decrypt the encrypted service $E\{Ks_{j,k}\}(j,k)$ to obtain the service j,k in the clear.

As can be seen, there are a number of actors involved: a smartcard manufacturer, an integrator that manufactures the decoder, one or more service providers and client that provides the decoder to the end-users. While the prior art solutions allow customizing the smartcard to work with a number of service providers by adding their keys, the number is limited to the number of fuses in a One Time Programmable flash memory in the smartcard (one fuse is blown per added key). In addition, since the keys must be added at the factory using a special machine, these service providers must be known before the customized smartcard is delivered.

It will thus be appreciated that there is a need for a system that allows an end-user to access service providers not initially considered. For security reasons, the decoder manufacturer should control the addition of service providers, and the secret keys of the service providers should not be made known to other actors, in particular to other service providers.

The present invention provides such a possibility.

SUMMARY OF INVENTION

In a first aspect, the invention is directed to a device for generating an encrypted master key. The device comprises at least one input interface configured to receive a receiver identifier, a service provider identifier and a master key for the service provider; a memory configured to store a secret of the device; a processor configured to: process the receiver identifier using the secret to obtain a root key, process the service provider identifier using the root key to obtain a top key, and process the master key using the top key to obtain an encrypted master key; and an output interface configured to output the encrypted master key.

In a first embodiment the device is implemented in a Hardware Secure Module.

In a second embodiment, the device is implemented in a smartcard.

In a third embodiment, the processor is configured to decrypt the receiver identifier using the secret as decryption key.

In a fourth embodiment, the processor is configured to encrypt the service provider identifier using the root key as encryption key.

In a fifth embodiment, the processor is configured to encrypt the master key using the top key as encryption key.

In a second aspect, the invention is directed to a method of providing an encrypted master key to a receiver. A device for generating an encrypted master key according to the first aspect receives, a receiver identifier ($STB_i$), a service provider identifier (Id(k)) and a master key ($Km_{j,k}$) for the service provider generating the encrypted master key from a first device; generates the encrypted master key; and outputs the generated encrypted master key that is sent, by a third device, to the receiver.

BRIEF DESCRIPTION OF DRAWINGS

Preferred features of the present invention will now be described, by way of non-limiting example, with reference to the accompanying drawings, in which.

DESCRIPTION OF EMBODIMENTS

The prior art solutions requires that the decoder manufacturer knows the service providers before the decoders are manufactured.

Adding a further key story makes it possible to get around this problem. Further, each service provider has a unique identifier Id(k) that does not have to be secret and a device that generates encrypted master keys, as will be further described hereinafter.

Figure 1:
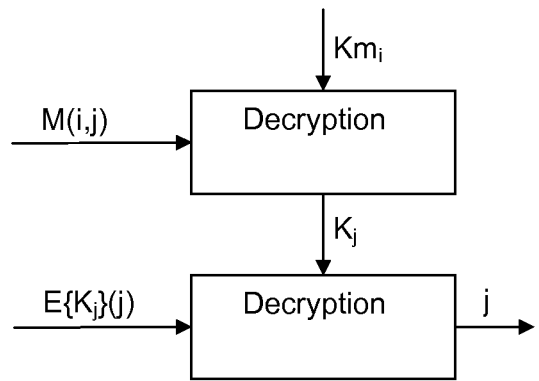
FIG. 1 illustrates a first prior art scheme for accessing to a service.
Figure 2:
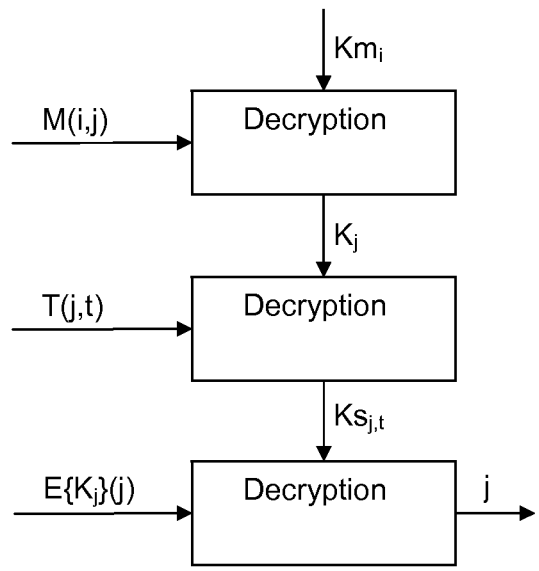
FIG. 2 illustrates a second prior art scheme for accessing to a service.
Figure 3:
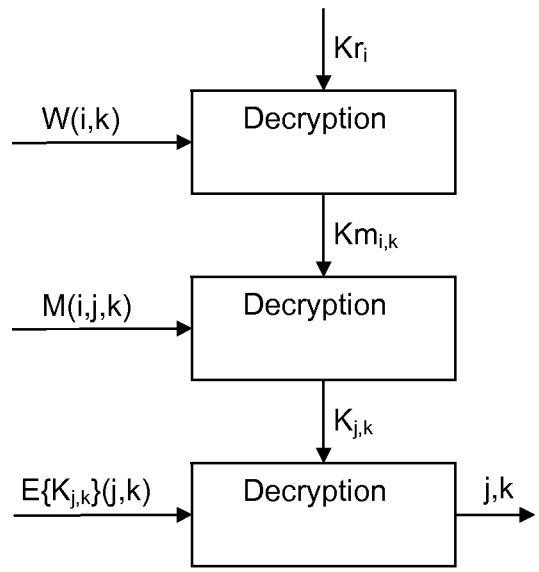
FIG. 3 illustrates a third prior art scheme for accessing to a service.
Figure 4:
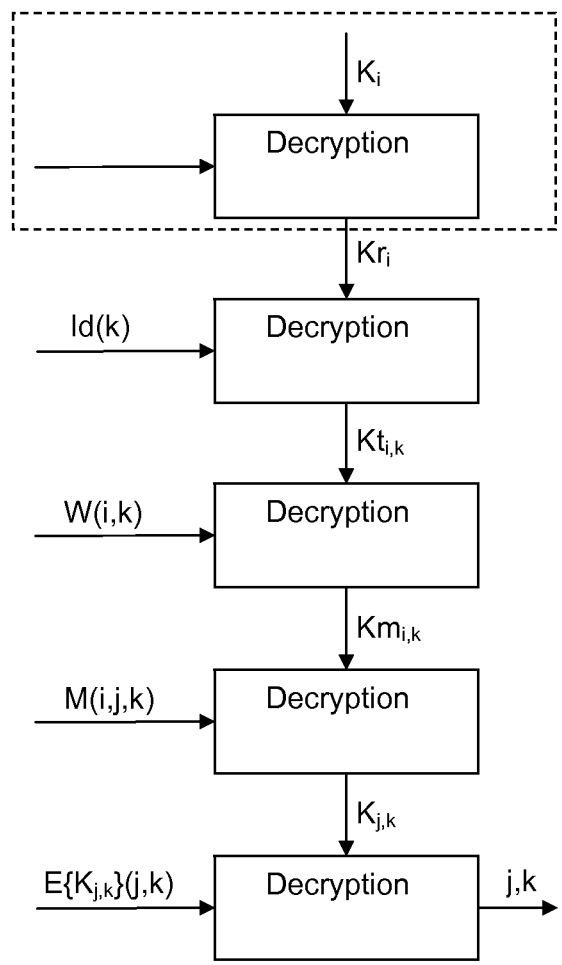
FIG. 4 illustrates accessing a service according to a preferred embodiment of the present invention.

FIG. 4 illustrates accessing a service according to a preferred embodiment of the present invention, which is an extension of the scheme illustrated in FIG. 3. A processor such as a smartcard or a crypto-processor in a System on Chip) of decoder i has access to its root key $Kr_i$ in one of at least two ways: the root key may be written in its memory or it may be generated by using a secret of the processor to decrypt an encrypted root key—the latter option is illustrated in the dashed box. The processor receives the identifier Id(k) of service provider k and decrypts it using its root key $Kr_i$ to obtain a top key $Kt_{i,k}$ for the processor and the service provider. The encrypted master key W(i,k) is decrypted using the top key $Kt_{i,k}$ to obtain the master key $Km_{i,k}$, which is used to decrypt a second message (M,i,j,k) to obtain a service key $K_{j,k}$ for the service provider k. The service key $K_{j,k}$ is then used to decrypt the encrypted service $E\{Ks_{j,k}\}(j,k)$ to obtain the service j,k in the clear.

Figure 5:
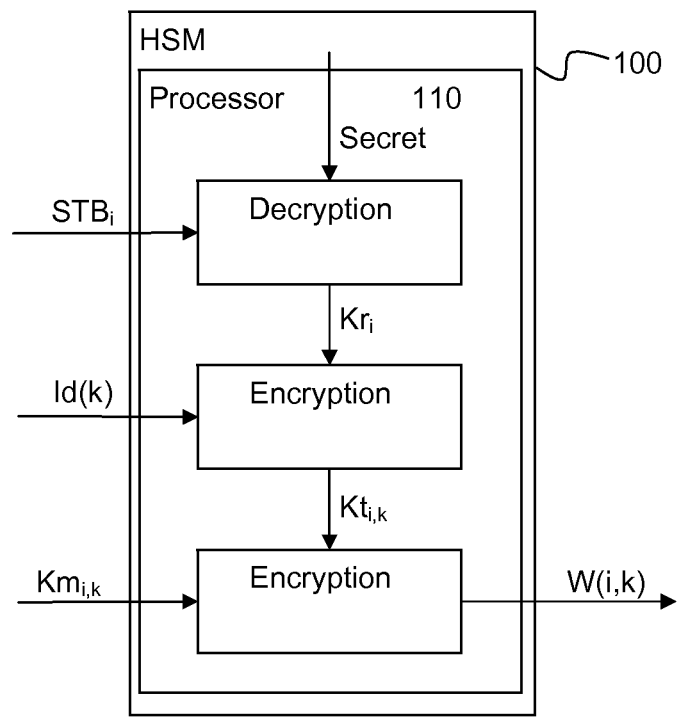
FIG. 5 illustrates a Hardware Security Module according to a preferred embodiment of the present invention.

Service provider k obtains the encrypted master key W(i,k) for user i in a secure manner using a so-called Hardware Security Module (HSM) 100 provided by the decoder manufacturer, as illustrated in FIG. 5. The HSM 100 is implemented to keep its secret information concealed to the outside. The HSM 100 comprises at least one processor 110 and other necessary but, for the sake of clarity, non-illustrated features such as input and output interfaces, memory, internal connections and a power source (whose energy may be provided from the outside).

The HSM 100 receives, from a device, the identifier STBi of a receiver, the service provider identifier Id(k) and the master key $Km_{i,k}$ for the service provider and the receiver. The processor 110 obtains, from an internal memory, the secret of the HSM and uses it to decrypt the identifier STBi to obtain a root key $Kr_i$. The processor then uses the root key $Kr_i$ to encrypt the service provider identifier Id(k) to obtain the top key $Kt_{i,k}$ that is then used to encrypt the master key $Km_{i,k}$ to obtain the encrypted master key W(i,k) that is then output by the HSM 100 and sent to decoder i where it can be used to access the service. Since the encrypted master key W(i,k) is already encrypted, there is no need to encrypt it further for the transmission (using any suitable transmission device and method such as email or in-band transmission) to the decoder. It should be noted that in symmetric encryption, encryption and decryption are essentially identical.

It will be appreciated that since the top key $Kt_{i,k}$ is not output by the HSM 100, it cannot be changed by the service provider, which means that the service providers are isolated from one another from a security point of view.

The skilled person will appreciate that the present invention can provide a solution that allows a smartcard to access new service providers in a secure manner.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A device for generating an encrypted master key, the device comprising:
   at least one input interface configured to receive a receiver identifier, a service provider identifier associated with a service provider and a master key for the service provider, the service provider being a secondary service provider;
   a memory configured to store a secret information of the device;
   a processor configured to:
      process the receiver identifier using the secret information to obtain a root key;
      process the service provider identifier using the root key to obtain a top key; and
      process the master key using the top key to obtain an encrypted master key; and
   an output interface configured to output the encrypted master key.

2. The device of claim 1, wherein the device is implemented in a Hardware Secure Module.

3. The device of claim 1, wherein the device is implemented in a smartcard.

4. The device of claim 1, wherein the processor is configured to decrypt the receiver identifier using the secret information as a decryption key.

5. The device of claim 1, wherein the processor is configured to encrypt the service provider identifier using the root key as an encryption key.

6. The device of claim 1, wherein the processor is configured to encrypt the master key using the top key as an encryption key.

7. A method of providing an encrypted master key to a receiver, the method comprising:
   receiving, by a device, a receiver identifier, a service provider identifier associated with a service provider and a master key for the service provider, the service provider being a secondary service provider;
   processing, by the device, the receiver identifier using a secret information stored in a memory to obtain a root key;
   processing, by the device, the service provider identifier using the root key to obtain a top key;
   processing, by the device, the master key using the top key to obtain an encrypted master key; and
   outputting, by the device, the encrypted master key.

8. The method of claim 7, wherein the device is implemented in a Hardware Secure Module.

9. The method of claim 7, wherein the device is implemented in a smartcard.

10. The method of claim 7, further comprising decrypting, by the device, the receiver identifier using the secret information as a decryption key.

11. The method of claim 7, further comprising encrypting, by the device, the service provider identifier using the root key as an encryption key.

12. The method of claim 7, further comprising encrypting, by the device, the master key using the top key as an encryption key.

13. A non-transitory computer readable medium with instructions stored therein which upon execution cause at least one processor to:
   detect receipt of a receiver identifier, a service provider identifier associated with a service provider and a master key for the service provider, the service provider being a secondary service provider;
   store secret information;
   process the receiver identifier using the secret information to obtain a root key;
      process the service provider identifier using the root key to obtain a top key;
      process the master key using the top key to obtain an encrypted master key; and
   output the encrypted master key.

14. The non-transitory computer readable medium of claim 13, wherein the at least one processor is arranged and configured in a Hardware Secure Module.

15. The non-transitory computer readable medium of claim 13, wherein the at least one processor is arranged and configured in a smartcard.

16. The non-transitory computer readable medium of claim 13, wherein the instructions stored therein further cause the at least one processor to decrypt the receiver identifier using the secret information as a decryption key.

17. The non-transitory computer readable medium of claim 13, wherein the instructions stored therein further cause the at least one processor to encrypt the service provider identifier using the root key as an encryption key.

18. The non-transitory computer readable medium of claim 13, wherein the instructions stored therein further cause the at least one processor to encrypt the master key using the top key as an encryption key.

* * * * *